Sept. 1, 1925.
E. W. CARVER
1,551,641
WINDMILL
Filed Nov. 6, 1924
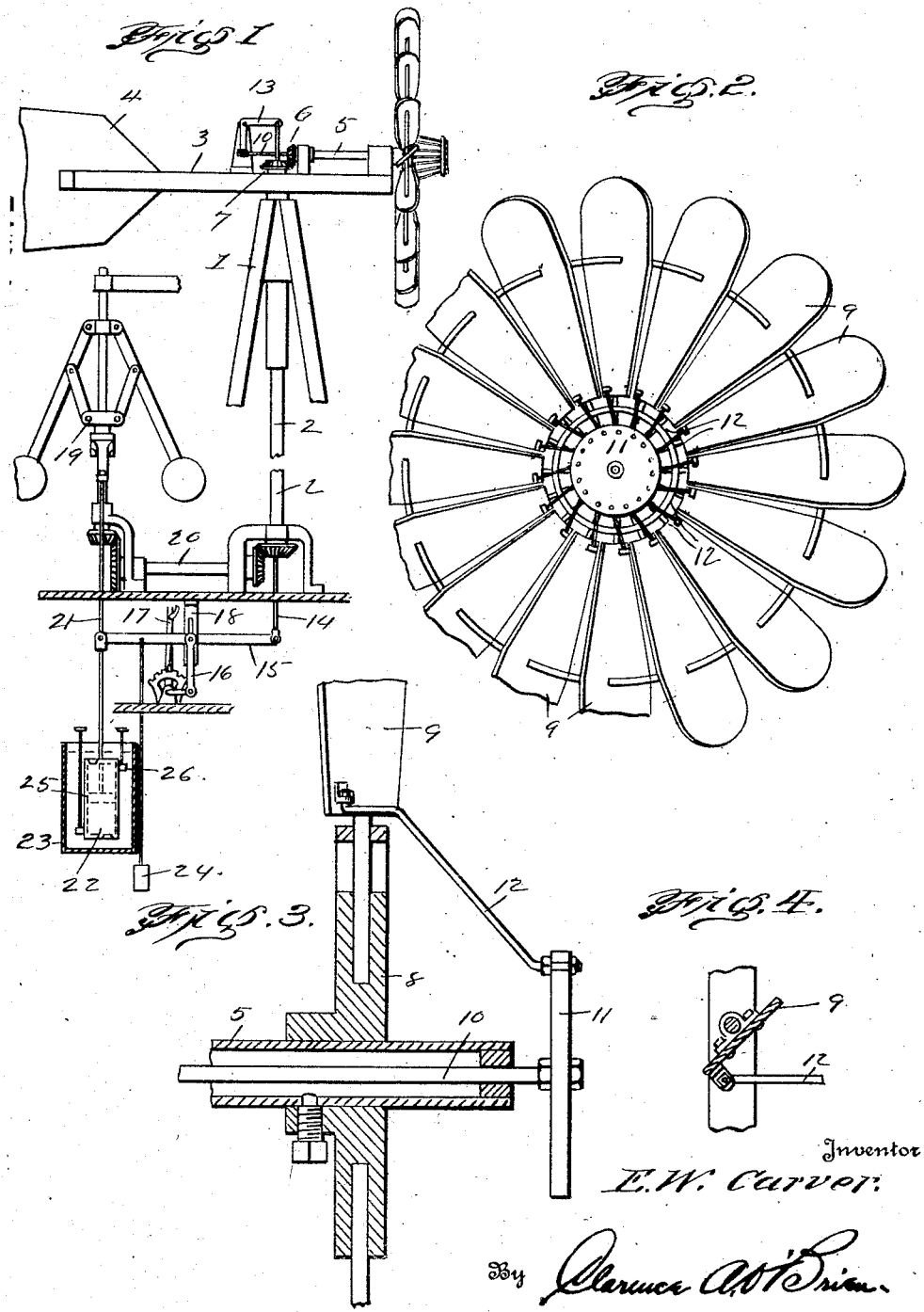
Inventor
E. W. Carver.
By Clarence A. O'Brien.
Attorney Patented Sept. 1, 1925.

1,551,641

UNITED STATES PATENT OFFICE.

EBENEZER W. CARVER, OF TACOMA, WASHINGTON.

WINDMILL.

Application filed November 6, 1924. Serial No. 748,175.

*To all whom it may concern:*

Be it known that I, EBENEZER W. CARVER, a citizen of the United States, residing at Tacoma, in the county of Pierce and State of Washington, have invented certain new and useful Improvements in a Windmill, of which the following is a specification.

This invention relates to wind mills and it consists in the novel features hereinafter described and claimed.

An object of the invention is to provide a wind mill structure with means for automatically regulating the speed at which the mill will operate under variable wind conditions and in order that the mill may be used to advantage for charging electric batteries or for performing other work requiring regular and uniform speed.

With the above object in view the wind mill structure includes a tower having a vertically disposed hollow shaft journaled thereon and with a governor mechanism operatively connected with the shaft. An arm is rotatably mounted upon the upper end of the tower and carries at one end a vane. A wheel shaft is journaled upon the arm and is operatively connected with the first mentioned shaft. The said wheel shaft is hollow and a series of blades is pivotally mounted upon the said wheel shaft. A rod is movably mounted in the wheel shaft and carries at one end a disc which is operatively connected with the blade by means of bars whereby the said blades are turned as the said disc and rod are moved with relation to the wheel shaft. A lever mechanism is mounted at the lower portion of the tower and is operatively connected by means of a rod extending through the first mentioned shaft and connected with the rod in the wheel shaft. Said lever mechanism is operatively connected with the governor mechanism. The parts and features are so assembled and connected with each other that as the force of the wind increases, the blades are turned so that their edges are presented to the wind and consequently the area of the blades at the windward side of the wheel is reduced in the wind and thus the wheel will rotate at a uniform rate of speed notwithstanding variations in the speed of the wind.

In the drawing:—

Figure 1 is a side elevation of the wind mill.

Figure 2 is a fragmentary side elevation of the wheel of the mill.

Figure 3 is a detail sectional view through the wheel of the mill.

Figure 4 is a sectional view through one of the blades of the wheel.

The windmill structure comprises a tower 1 having a hollow shaft 2 journaled therein. The shaft 2 is vertically disposed. An arm 3 is mounted for turning movement at the upper end of the tower and carries at one end a vane 4. A hollow wheel shaft 5 is journaled for rotation upon the arm 3 and is provided at its inner end with a beveled pinion 6 which meshes with a similar pinion 7 mounted at the upper end of the shaft 2. A hub 8 is fixed to the shaft 5 and radially disposed blades 9 are pivotally mounted upon the hub 8. A rod 10 extends through the shaft 5 and is provided at one end with a disc 11. The disc 11 is connected with the blades 9 by means of rod sections 12, the said rod sections being pivotally connected with the said blades at one side of their axes and whereby the said blades 9 may be turned upon the hub 8 as the disc 11 is moved toward or away from the end of the shaft 5. A bell crank lever 13 is pivoted upon the arm 3 and one end thereof is connected with the rod 10. A rod 14 extends through the shaft 2 and is connected at its upper end with the bell crank lever 13 and at its lower end with a lever 15 which in turn is mounted upon a link 16 supported by a lever 17. The fulcrum point of the lever 15 is slidably mounted in a guide 18 and may move vertically as the lever 17 is swung. A governor mechanism 19 is supported at the intermediate portion of the tower and is operatively connected by means of a shaft 20 with the shaft 2. A rod 21 is connected with the governor mechanism 19 and with one end of the lever 15. The lower end of the rod 21 is connected with a dash pot 22 which is submerged in oil contained in a tank 23. A weight 24 hangs pendant from the lever 15 and is disposed adjacent the tank 23. A piston 25 is connected with the lower end of the rod 21 and is slidably mounted in the dash pot 22. The dash pot 22 is provided with valves 26 which are located one at each side of the piston 25. Also with check valves at each end of cylinder 22.

It will be seen that when the blades are exposed to the wind, the action of the wind upon the vane 4 will turn the arm 3 so that the wind will strike the surfaces of the blades which are disposed toward the disc 11. As the velocity of the wind changes or varies, the blades 9 turn upon their pivotal connections with the hub 8 and the bars 12 are moved longitudinally whereby the disc 11 and the rod 10 are moved with relation to the shaft 5. The movement of the rod 10 swings the bell crank lever 13, whereby the rod 14 is moved longitudinally, the lever 15 is swung and the rod 21 is moved whereby the governor 19 is operated and the rotation of the shaft 2 from the shaft 5 is controlled.

By shifting the lever 15 and by using the lever 17 for so doing, the blades 9 may be swung upon the disc 8 and at the same time the governor 19 is manipulated so that the blades will rotate about the shaft 5 at a desired rate of speed.

The dash pot structure is provided to resist any sudden action of the governor for without such provision each puff of wind would throw the blades in and out of the wind. The check valves are provided to retard the circulation of the oil through the dash pot and consequently the action of the dash pot is retarded.

Having thus described the invention, what is claimed is:—

1. In a windmill, a supporting structure, a wind actuated member rotatably mounted in the supporting structure and including movable blades, a mechanism for changing the pitch of said blades, a governor operatively connected with the wind actuated member, a lever connected with said mechanism for operation thereof, a dash pot structure, a tank within which the dash pot is located, said tank adapted to be filled with oil in which the dash pot is submerged, check valves at the ends of the dash pot, a piston in the dash pot, a rod connected to the piston, to the lever, and to the governor.

2. In a windmill, a supporting structure, a wind actuated member rotatably mounted in the supporting structure and including movable blades, a mechanism for changing the pitch of said blades, a governor operatively connected with the wind actuated member, a lever connected with said mechanism for operation thereof, a dash pot structure, a tank within which the dash pot is located, said tank adapted to be filled with oil in which the dash pot is submerged, check valves at the ends of the dash pot, a piston in the dash pot, a rod connected to the piston, to the lever, and to the governor, and a weight suspended from the lever adjacent the connection thereof with the rod.

In testimony whereof I affix my signature.

EBENEZER W. CARVER.